(12) United States Patent
Kunjur et al.

(10) Patent No.: US 8,799,056 B2
(45) Date of Patent: Aug. 5, 2014

(54) METHOD AND SYSTEM FOR PRICING SOFTWARE SERVICE REQUESTS

(75) Inventors: Vishnuraj Kunjur, Karnataka (IN); Mathew Shaji, Karnataka (IN); Atul Jain, Karnataka (IN); Amitava Banerjee, Kolkata (IN); Bhaskarb, Karnataka (IN); Anoop Kumar, Karnataka (IN); Savio D'Souza, Karnataka (IN); Saktipada Maity, West Bengal (IN); Santhi Sandirassegarane, Karnataka (IN)

(73) Assignee: Infosys Limited (IN)

( * ) Notice: Subject to any disclaimer, the term of this patent is extended or adjusted under 35 U.S.C. 154(b) by 463 days.

(21) Appl. No.: 12/431,122

(22) Filed: Apr. 28, 2009

(65) Prior Publication Data

US 2009/0299786 A1 Dec. 3, 2009

(30) Foreign Application Priority Data

Apr. 28, 2008 (IN) .............. 1045/CHE/2008

(51) Int. Cl.
*G06Q 10/00* (2012.01)
*G06Q 30/00* (2012.01)
*G06F 17/00* (2006.01)
*G06G 7/00* (2006.01)

(52) U.S. Cl.
USPC .............. 705/7.35; 705/1.1; 705/400

(58) Field of Classification Search
CPC .................................. G06Q 30/0206
USPC ................. 705/1.1, 7.11–7.42, 400
See application file for complete search history.

(56) References Cited

U.S. PATENT DOCUMENTS

| | | | |
|---|---|---|---|
| 6,938,007 B1 | 8/2005 | Iulianello et al. | |
| 7,236,940 B2 | 6/2007 | Chappel | |
| 2002/0082881 A1* | 6/2002 | Price et al. | 705/7 |
| 2002/0128895 A1* | 9/2002 | Broderick et al. | 705/9 |
| 2003/0070157 A1 | 4/2003 | Adams et al. | |
| 2006/0235740 A1* | 10/2006 | Lea et al. | 705/10 |
| 2009/0222311 A1* | 9/2009 | Cao et al. | 705/8 |

FOREIGN PATENT DOCUMENTS

| | | | |
|---|---|---|---|
| JP | 2003263320 A | 9/2003 | |
| JP | 2007156820 A | 6/2007 | |

* cited by examiner

*Primary Examiner* — George Chen
(74) *Attorney, Agent, or Firm* — Lerner, David, Littenberg, Krumholz & Mentlik, LLP

(57) ABSTRACT

A system and method for pricing software service requests is provided. The method includes entering input details corresponding to a clients' software service usage data. The method further includes calculating a cost per ticket for each severity level of the software service request. A margin for each severity level is assigned to each severity level in the order of increasing severity. Thereafter, a price per software service request is calculated for each severity level using the corresponding margin. Additionally, the method includes determining an optimal staffing scheme corresponding to one or more software services.

17 Claims, 2 Drawing Sheets

METHOD AND SYSTEM FOR PRICING SOFTWARE SERVICE REQUESTS

FIELD OF INVENTION

Figure 1:
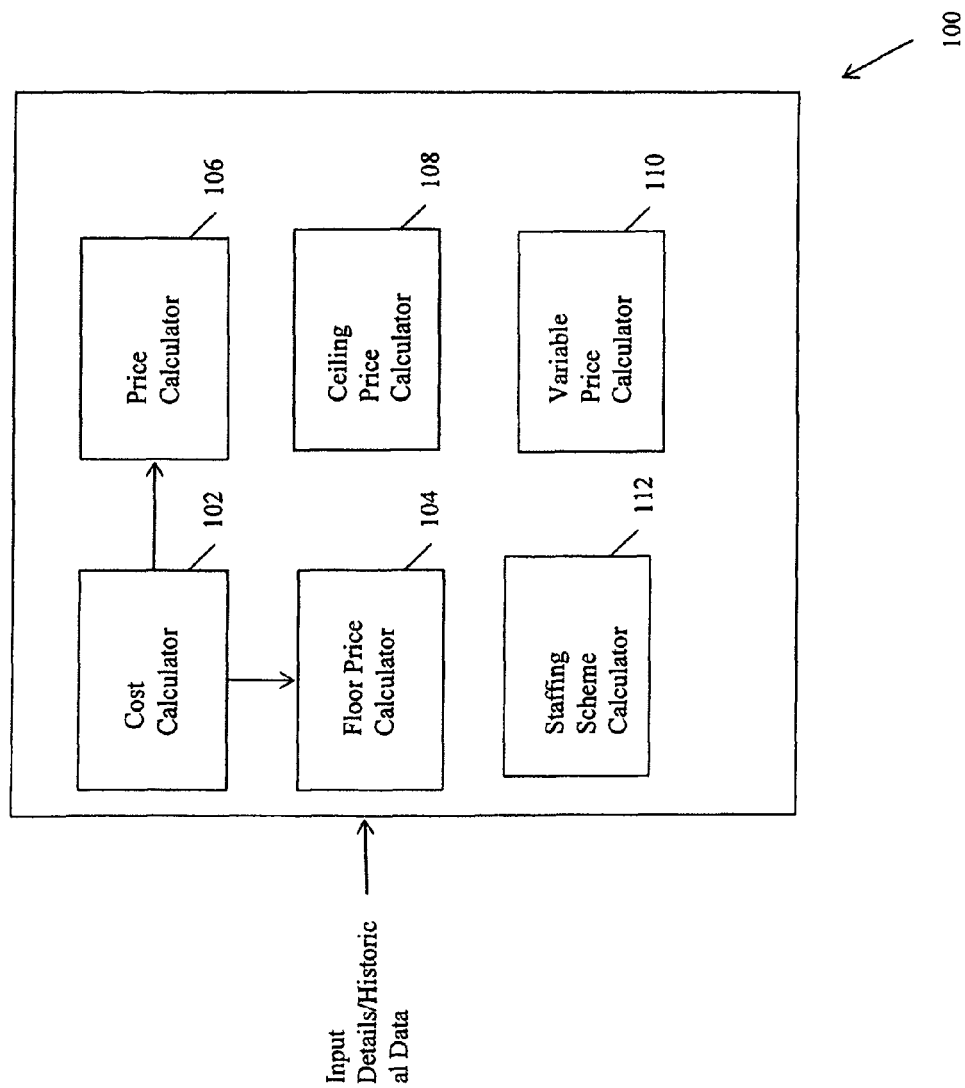

The present invention is directed towards service request management. More particularly, the present invention provides a method and system for pricing software maintenance requests on a per service request basis.

BACKGROUND OF THE INVENTION

In the field of Information Technology (IT), service request management is workflow and processes applied in the reception and execution of service requests by a service provider. Generally, a client's software service demand is unevenly distributed. For example, the number of software service requests fall drastically over certain months of a year and rise sharply over certain other months of the year.

Conventionally, clients pay on a fixed time basis for obtaining software services based on terms and conditions predefined in a Service Level Agreement (SLA). Further, clients usually make payments on a fixed rate basis for software service requests of varying severity levels. Severity level defines a software service request's characteristic in terms of complexity and urgency of the service. The practice of using a fixed rate basis for software service requests leads to ineffective resource utilization, difficulties in capacity planning and unproductive demand management.

Consequently, there is need for a system and a method for providing a variable pricing scheme for software service requests, thereby enabling clients to pay in accordance with a 'pay per use' model rather than a fixed payment model. Further there is need for a method that would enable client to reduce their costs corresponding to software service requests by absorbing seasonal and event based fluctuations in volume of service requests generated.

SUMMARY OF THE INVENTION

A method and system for pricing software service requests is provided. In an embodiment of the present invention, the software service requests are priced using a variable pricing scheme on a per service request basis.

In various embodiments of the present invention, the method includes entering input details corresponding to a client's software services usage data. Further, the method includes computing a price per software request to be charged to the client. Thereafter, an optimal staffing scheme is computed corresponding to the one or more software services.

In an embodiment of the present invention, the method comprises calculating a floor price per software request for each severity level of the request.

In various embodiments of the present invention, a price per software request is computed by calculating a cost per ticket for each severity level and assigning a margin for each severity level in the order of increasing severity. Subsequently, price per software service request is calculated for each severity level using the corresponding margin.

In an embodiment of the present invention, a system for pricing one or more software service requests is provided. The system comprises a cost calculator configured to calculate a general cost for a software service request and a floor price calculator configured to calculate a floor price for each severity of software service request using the general cost. Further, the system comprises a price calculator configured to calculate price per software service request. Additionally, the system comprises a staffing scheme calculator configured to estimate an optimal staffing scheme for servicing the one or more software service requests.

In various embodiments of the present invention, the system includes a ceiling price calculator configured to calculate a maximum price charged from a client for servicing a maximum number of software service requests. Moreover, the system includes a variable price calculator configured to calculate a price for servicing a number of software service requests greater than a minimum number of service requests corresponding to a floor price.

BRIEF DESCRIPTION OF THE ACCOMPANYING DRAWINGS

Figure 2:
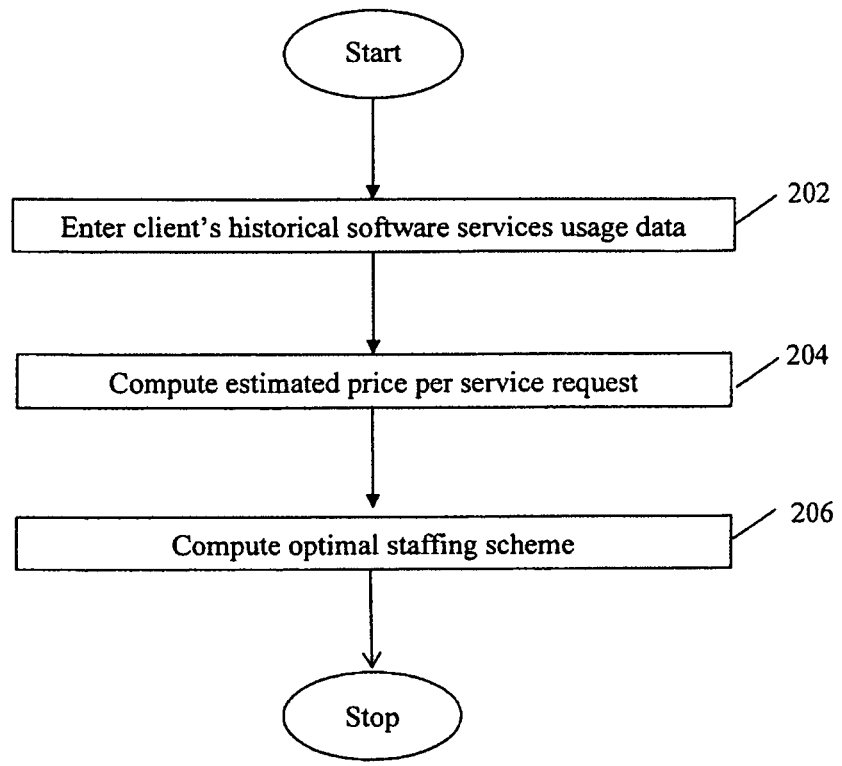

The present invention is described by way of embodiments illustrated in the accompanying drawings wherein:

FIG. 1 is a block diagram illustrating a system for pricing software service requests; and FIG. 2 is a flowchart illustrating a method for pricing software service requests.

DETAILED DESCRIPTION OF THE INVENTION

A method and system for pricing software maintenance activities on a per service request basis is described herein. The present invention provides a statistical computational tool that enables clients using software services to pay based on use of the software services rather than on a fixed price basis. Pricing of software services is done based on the severity or complexity/urgency of the service, client's historical data as well as the terms and conditions stated in a corresponding Service Level Agreement (SLA).

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

FIG. 1 is a block diagram of a service request pricing tool 100 for pricing software service requests. The service request pricing tool 100 comprises a cost calculator 102, a floor price calculator 104, a price calculator 106, a ceiling price calculator 108, a variable price calculator 110 and a staffing scheme calculator 112.

The service request pricing tool 100 is a statistics computational tool that facilitates pricing of one or more software service requests. Software service requests are requests initiated by one or more clients for requesting software maintenance services from a software service provider. The software maintenance services may include, but are not limited to, Information Technology (IT) support and IT maintenance work.

A software service request may be referred to as a ticket. In an embodiment of the present invention, each ticket may have a complexity/urgency level referred to as severity limit. In another embodiment of the present invention, the number of hours required to serve a ticket may be referred to as effort per ticket, where effort per ticket may be a combination of onsite and offshore effort. Onsite effort of a ticket is effort spent in deploying resources at client's location for serving the ticket. Offshore effort of a ticket is effort spent in deploying resources at a client's location abroad for serving the ticket. In yet another embodiment of the present invention, the cost incurred by service provider for serving a ticket may be referred to as cost per ticket, where cost per ticket may be a combination of onsite cost and offshore cost.

Cost calculator 102 estimates average cost per ticket for multiple severity levels based on details pertaining to tickets obtained and served by the service provider over a pre-defined period of time. In an embodiment of the present invention, the details pertaining to tickets include, but are not limited to, number of tickets arrived, severity level of service request, onsite and offshore effort per ticket, onsite cost per Full Time Equivalent (FTE), and offshore cost per FTE.

In another embodiment of the present invention, the details comprise historical data related to the servicing of requests. Historical Data includes parameters such as: Ticket arrival: number of software service requests that arrive in a pre-defined period of time, for example, number of software service requests that arrive per month; Ticket effort: effort required for servicing each software service request, for example, number of hours required for servicing each software service request; Onsite Cost/FTE: cost of deploying resources at a client's location (onsite) for servicing the client's software service requests including effort spent by said resources for servicing the requests; Offshore Cost/FTE: cost of deploying resources at a client's location abroad (offshore) for servicing the client's software service requests including effort spent by said resources for servicing the requests; percentage of onsite versus offshore effort per software service request; severity or complexity/urgency of each software service request that arrive in a predefined period of time; and terms and conditions corresponding to pricing of software service requests specified in a Service Level Agreement (SLA). In an example, the historical data is data corresponding to six months of servicing software requests.

In yet another embodiment of the present invention, details pertaining to ticket request include number of hours equivalent to Onsite/offshore FTE, Routine Onsite/Offshore Effort, number of full time equivalent (FTE) hours committed for servicing a client, Stretch Factor: non-billable service hours committed to the client, managerial effort in terms of number of hours spent for servicing the client's software service request, Routine Onsite/Offshore Effort: 10%-20% value of resolution effort values (if historical data is not available), Monthly average of Effort/ticket, SLA and Severity of the ticket.

In yet another embodiment of the present invention, details pertaining to ticket request include monetary details, such as, minimum assured margin, overhead percentage, floor calculation, Expected Ratio of Price per Ticket for different severities, onsite cost/FTE, offshore cost/FTE, severity-specific details, tickets arrival, onsite, offsite % effort, Monthly average of Onsite cost, offshore cost/Onsite Proportion for Servicing Tickets.

In an embodiment of the present invention, onsite cost per FTE is cost of deploying one FTE at onsite for serving tickets. In another embodiment of the present invention, offshore cost per FTE is cost of deploying one FTE offshore for serving tickets. Further, onsite cost per hour of a ticket is obtained by dividing onsite cost per FTE by available person hours in one onsite person month. The offshore cost per hour is calculated in the similar manner. The onsite cost per ticket is calculated by multiplying onsite cost per hour and onsite effort of a ticket. The offshore cost per ticket is calculated by multiplying offshore cost per hour and offshore effort of a ticket. The general cost per ticket is calculated by adding the onsite cost per ticket and the offshore cost per ticket. In various embodiments of the present invention, the total direct cost per ticket is calculated for each severity of a service request. In an example, onsite cost per hour for each severity is separately calculated. Similarly, offshore cost per hour is calculated. The total direct cost is calculated as onsite effort multiplied by onsite cost (for the respective severity) plus offshore effort multiplied by offshore cost (for the respective severity).

In various embodiments of the present invention, a floor price calculator 104 calculates a floor price for each severity of a project using the general cost per ticket. The floor price is calculated by means of two different cost models: a routine cost model and a total cost model. A floor price is the minimum price that may be charged from a client for servicing a predefined number of software service requests in a predefined period of time. Hence, floor price can be the minimum amount that a client would have to pay per predefined period even if the number of software service requests generated by the client fall below a predefined number for that period of time. In the routine cost model, general cost per ticket of each severity level is calculated and the costs are summed up to obtain a total direct cost per ticket. The total direct cost per ticket is calculated as onsite effort multiplied by onsite cost (for the respective severity) plus offshore effort multiplied by offshore cost (for the respective severity). Thereafter, distribution of direct cost per ticket is determined. From the distribution, a specified percentile point is taken as the floor price. In an embodiment of the present invention, the specified percentile point is an eighty percentile point. Hence, if an overhead percentage is 'x', a cost per software service request may be estimated by multiplying the base cost by (1+x). Subsequently, successive floor prices are calculated by increasing the floor prices by 5 percentile points.

In the total cost model, general cost per ticket of each severity level is obtained from a database. The total direct cost per ticket is then calculated and the total cost is apportioned to ticket arrival. Thereafter, a distribution of the direct cost per ticket is determined. From the distribution, a specified percentile point is taken as the floor price. In an embodiment of the present invention, the specified percentile point is an eighty percentile point. Hence, if an overhead percentage is 'x', a cost per software service request may be estimated by multiplying the base cost by (1+x). Subsequently, successive floor prices are calculated by increasing the floor prices by 5 percentile points.

In various embodiments of the present invention, a price calculator 106 calculates price of a ticket based on statistical algorithms using margins for tickets of different severity. In an embodiment of the present invention, the price of a ticket is calculated as follows:

Let M1, M2 and M3 be the margins for different severity levels in the order of increasing severity. Let W1, W2 and W3 be the costs per ticket. Let Q be the minimum margin that needs to be assured for each ticket. In an example, Q is provided as input by a user. Thus, price per ticket $P_1, P_2, P_3 \ldots P_j$ can be calculated based on margins $M_1, M_2, M_3 \ldots M_j$ greater than Q. The price per ticket $P_1, P_2, P_3$ are calculated by the formulae:

$$P_j = W_j(1+M_i) \text{ for } i=1,2,3\ldots$$

In an embodiment of the present invention, the following constraints are used for calculating the price of tickets:

Severity 1 ticket must have a price higher by at least 40% than severity 2 and Severity 2 ticket must have a price higher by at least 40% than Severity 3 and so on An expected ratio of price per ticket is provided for the severity levels.

An iteration of value of margins is done based on the following:
1) Irrespective of severity level, Margin should be greater than or equal to Minimum margin
2) Start with Margin 1 equal to Margin 2 equal to Margin 3 equal to Minimum Margin Ratio between Cost per ticket for high level severity *(1+M1) and Cost per ticket for medium level severity *(1+M2) is greater than and equal to the ratio of Expected price per ticket for high level severity and Expected price per ticket for medium level severity Ratio between Cost per ticket for medium level severity *(1+$M_1$) and Cost per ticket for low level severity *(1+$M_2$) is greater than and equal to the ratio of Expected price per ticket for medium level severity and Expected price per ticket for low level severity Ratio between Cost per ticket for high level *(1+$M_1$) and Cost per ticket for low level severity *(1+$M_2$) is greater than and equal to the ratio of Expected price per ticket for high level severity and Expected price per ticket for low level severity Ceiling price calculator 108 is the maximum price that can be charged from a client for servicing a maximum number of software service requests in a predefined period of time. In an embodiment of the present invention a ceiling price may be obtained from a committed effort. Firstly, a committed number of FTEs is obtained and a total effort available is computed. Secondly, a percentage of extra effort i.e. number of hours spent in servicing software service requests in addition to regular working hours is obtained. Next, equivalent software service requests for each severity level for both onsite and offshore scenarios is obtained, where an equivalent service request is defined as ratio of average effort spent at onsite and offshore locations. A minimum price for servicing software service requests of the computed equivalent software service requests is taken as a ceiling price.

In an embodiment of the present invention, variable price calculator 110 calculates variable price for software service request. Variable price is a price that may be charged from a client for servicing a number of software service requests greater than the minimum number of service requests committed corresponding to a floor price. The variable price is determined based on input parameters and the severity of the additional number of software requests serviced as well as terms and conditions specified in the SLA. Any ticket resolution above the floor price will be based on premium pricing based on the severity. Any ticket resolution above the floor will be charged based on use.

Staffing scheme calculator 112 estimates an optimal staffing scheme for servicing the client's software service requirements based on a client's historical data/input parameters. In an embodiment of the present invention, optimal staffing scheme may be defined as a total number of resources comprising FTEs and managers that would be required at onsite and offshore locations for servicing tickets corresponding to a client for a predefined period of time. In an example, the resources are: a total effort in terms of number of hours committed for servicing a client's software service requests; and a total managerial effort in terms of number of hours/cost committed for servicing a client's software service requests.

In an embodiment, statistical and simulation based algorithms are used for computing the optimal staffing scheme. In order to compute an optimal staffing scheme, a total onsite and offshore direct effort may be used. Total required number of FTEs would be equal to sum of onsite and offshore FTEs utilized for resolution and routine for all levels of severity. In an embodiment of the present invention, the required number of FTEs is calculated by the formula:

Total number of FTEs required=number of onsite FTEs+number of offshore FTEs=(number of offshore resolution FTEs+number of onsite routine FTEs)×{(ME)/(1+ME)}+(number of offshore routine FTEs)×{(ME)/(1+ME)} where ME=managerial effort. Managerial effort is defined in terms of number of managerial hours spent for servicing the client's software service requests.

Total number of managers=number of onsite managerial FTEs+number of offshore managerial FTEs+number of onsite routine FTEs/(1+ME)+number of offshore routine FTEs (ME/1+ME)

In various embodiments of the present invention, the output displayed by service request pricing tool 100 comprises an estimated cost per software service request corresponding to each severity level, a total effort in terms of number of hours committed for servicing a client's software service requests, a total cost committed for servicing a client's software service requests, a total managerial effort in terms of number of hours/cost committed for servicing a client's software service requests, a total number of FTEs committed for servicing a client's software service requests, a margin for each combination of floor price per software application service request and price per software application service request for various categories depending upon the severity level, a total ceiling effort for all the software service requests attended to and SLA guidelines.

FIG. 2 is a flowchart illustrating the method for pricing software service requests. At step 202, a client's historical software services usage data along with other input parameters is entered. In an embodiment of the present invention, the data entered comprises data such as number of software service requests that arrive in a predefined period of time, effort required for servicing each software service request, cost of deploying resources at a client's location (onsite) for servicing the client's software service requests including effort spent by said resources for servicing the requests, cost of deploying resources at a client's location abroad (offshore) for servicing the client's software service requests including effort spent by said resources for servicing the requests, percentage of onsite versus offshore effort per software service request; severity or complexity/urgency of each software service request that arrive in a predefined period of time, and terms and conditions corresponding to pricing of software service requests specified in a Service Level Agreement (SLA).

At step 204, a price per software service request that may be charged from the client is computed. In various embodiments of the present invention, statistical and simulation based algorithms are used for computing the estimated price per software service request that may be charged from the client.

In an exemplary embodiment of the present invention the price for software service request is calculated as follows:
Let W1, W2, and W3 depict a cost per software service request of severity level 1, 2 and 3 respectively; and M1, M2 and M3 depict a predefined margin (percentage profit) corresponding to software service requests of severity levels 1, 2 and 3 respectively. Let Q depicts a predefined minimum threshold margin corresponding to each software service request. P1, P2, P3 . . . Pj depict prices of software service requests of severity levels 1, 2, 3, . . . respectively which are calculated using the criteria of margins M1, M2, M3, . . . , Mj being greater than or equal to Q for j=1, 2, 3 . . . such that $W1(1+M1) > W2(1+M2) > W3(1+M3)$. In an embodiment of the present invention, additional criteria used for calculating the prices are:

$$P1 > 40\% \; P2, P2 > 40\% \; P3, \ldots;$$

$$W1(1+M1)/W2(1+M2) >= P1/P2;$$

$$W2(1+M2)/W3(1+M3) >= P2/P3;$$

$$W1(1+M1)/W3(1+M3) >= P1/P3;$$

In an embodiment of the present invention, as explained in the description of FIG. 1, a floor price, a ceiling price and a variable price for a software request are also calculated.

At step 206, an optimal staffing scheme corresponding to the client is computed. Optimal staffing scheme may be defined as a total number of resources comprising FTEs and managers that would be required at onsite and offshore locations for servicing software service requests corresponding to a client for a predefined period of time. Statistical and simulation based algorithms are used for computing the optimal staffing scheme.

Therefore the present invention provides a method and system for pricing software maintenance activities on a per software service request basis enabling clients using software services to pay based on use of the software services rather than on a fixed price basis. The present invention also enables clients to manage their demand for software services, thereby managing costs as clients no longer require to worry about seasonal and event based fluctuation in volume of software service requests. Further, the present invention provides a benefit to software service providers by providing them with more flexibility of resources, and enables them to improve productivity.

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various changes in form and detail may be made therein without departing from or offending the spirit and scope of the invention.

What is claimed is:

1. A computing system for pricing one or more software service requests, the computing system comprising at least one processor, the at least one processor being configured to:
   calculate a general cost for a software service request, wherein the general cost comprises an onsite cost and an offshore cost, wherein:
   the software service request is associated with a plurality of severity levels, each one of the plurality of severity levels being based on at least one of complexity and urgency associated with the software service request;
   the onsite cost of the service request includes a cost that results from a deployment of a first set of resources at an onsite client location, and
   the offshore cost of the service request includes a cost that results from a deployment of a second set of resources at an offshore client location, the offshore client location being located in a different country than the onsite client location;
   calculate a floor price for the software service request using a routine cost model, wherein:
   the floor price is a fixed price for at most a predetermined number of software service requests that is charged to a client regardless of whether the client makes the full predetermined number of software service requests, and
   the routine cost model comprises calculation of the general cost for the software service request for each one of the plurality of severity levels; and
   estimate an optimal staffing scheme for servicing the one or more software service requests wherein the optimal staffing scheme comprises resources for the onsite location and the offshore location.

2. The computing system of claim 1 wherein the processor is further configured to:
   calculate a maximum price that is charged to a client for servicing a maximum number of software service requests in a predefined period of time; and
   calculate a variable price that is charged to a client for servicing a number of software service requests greater than a minimum number of service requests corresponding to a floor price.

3. The computing system of claim 1, wherein the calculation of the general cost is based on at least one of a number of software service requests arrived, effort required for servicing a request, cost of deploying the first set and the second set of resources, severity of each request and terms and conditions corresponding to pricing of requests.

4. The computing system of claim 1, wherein the optimal staffing scheme indicates a total number of resources comprising Full Time Equivalents (FTEs) and managers that would be required at onsite and offshore locations for servicing the one or more software service requests for a predefined period of time.

5. The computing system of claim 1, wherein the processor is further configured to calculate a price for the software service request based on statistical algorithms using distinct margins for software service requests of different severity levels.

6. A computer implemented method for pricing one or more software service requests, the computer implemented method comprising:
   calculating, using the at least one computer, a floor price per software service request for each one of a plurality of severity levels, each severity level in the plurality being based on at least one of complexity and urgency associated with the software service request, and the floor price being a fixed price for at most a predetermined number of software service requests that is charged to a client regardless of whether the client makes the full predetermined number of software service requests, wherein the floor price is calculated using
   a routine cost model, wherein the routine cost model comprises calculation of the general cost per software service request for each one of the plurality of severity levels;
   computing, using the at least one computer, a price per software request to be charged to the client; and
   computing, using the at least one computer, an optimal staffing scheme corresponding to the one or more software services wherein the optimal staffing scheme comprises resources for the onsite location and the offshore location.

7. The computer implemented method of claim 6, further comprising:
   receiving, using at least one computer, input data;
   wherein the floor price is calculated using the input data; and
   wherein the input data indicates at least one of a number of software service requests arrived, effort required for servicing a request, cost of deploying onsite and offshore resources, severity of each request and terms and conditions corresponding to pricing of requests.

8. The computer implemented method of claim 6, wherein calculating the floor price further comprises:
calculating a direct cost per software service request for each one of the plurality of severity levels;
determining a distribution of the direct cost; and
determining a floor price per software service request based on the distribution using a pre-determined percentile point.

9. The computer implemented method of claim 6, wherein computing a price per software request comprises:
calculating a cost per software service request for each one of the plurality of severity levels;
assigning a margin to each one of the plurality of severity levels; and
calculating price per software service request for each one of the plurality of severity levels using the the margin that is assigned to that severity level.

10. A computer program product comprising:
a non-transitory computer-readable medium having a computer readable program code embodied therein for pricing one or more software service requests, the computer-readable program code comprising instructions that when executed by a processor, cause the processor to:
calculate a floor price per software service request for each one of a plurality of severity levels, each severity level in the plurality being based on at least one of complexity and urgency associated with the software service request, and the floor price being a fixed price for at most a predetermined number of software service requests that is charged to a client regardless of whether the client makes the full predetermined number of software service requests, wherein the floor price is calculated using
a routine cost model, wherein the routine cost model comprises calculation of the general cost per software service request for each one of the plurality of severity levels, and
compute an optimal staffing scheme corresponding to the one or more software services wherein the optimal staffing scheme comprises resources for the onsite location and the offshore location.

11. The computer program product of claim 10, wherein calculating the floor price further comprises:
calculating a direct cost per software service request for each one of the plurality of severity levels;
determining a distribution of the direct cost; and
determining the floor price per software service request based on the distribution using a pre-determined percentile point.

12. The computer program product of claim 10, wherein the computation of the price per software request comprises:
calculating a cost per software service request for each one of the plurality of severity levels;
assigning a margin to each one of the plurality of severity levels; and
calculating price per software service request for each one of the plurality of severity levels using the margin assigned to that severity level.

13. A computer program product comprising a non-transitory computer-readable medium having a computer readable program code embodied therein for pricing one or more software service requests, the computer-readable program code comprising instructions that when executed by a processor, cause the processor to:
calculate a general cost for a software service request, wherein the general cost comprises an onsite cost and an offshore cost, wherein:
the software service request is associated with a plurality of severity levels, each one of the plurality of severity levels being based on at least one of complexity and urgency associated with the software service request;
the onsite cost of the service request includes a cost that results from a deployment a first set of resources at an onsite client location, and
the offshore cost of the service request includes a cost that results from a deployment of a second set of resources at an offshore client location, the offshore client location being located in a different country than the onsite client location; and
calculate a floor price for the software service request using a routine cost model, wherein:
the floor price is a fixed price for at most a predetermined number of software service requests that is charged to a client regardless of whether the client makes the full predetermined number of software service requests, and
the routine cost model comprises calculation of the general cost for the software service request for each one of the plurality of severity levels.

14. The computer program product of claim 13 wherein the computer-readable program code further comprises instructions that when executed by a processor, cause the processor to:
calculate a maximum price that is charged to a client for servicing a maximum number of software service requests in a predefined period of time; and
calculate a variable price that is charged to a client for servicing a number of software service requests greater than a minimum number of service requests corresponding to a floor price.

15. The computer program product of claim 13, wherein the calculation of the general cost is based on at least one of a number of software service requests arrived, effort required for servicing a request, cost of deploying the first set and the second set of resources, severity of each request and terms and conditions corresponding to pricing of requests.

16. The computer program product of claim 13, wherein the computer-readable program code further comprises instructions that when executed by a processor, cause the processor to:
estimate an optimal staffing scheme for servicing the one or more software service requests wherein the optimal staffing scheme comprises resources for the onsite location and the offshore location;
wherein the optimal staffing scheme indicates a total number of resources comprising Full Time Equivalents (FTEs) and managers that would be required at onsite and offshore locations for servicing the one or more software service requests for a pre-defined period of time.

17. The computer program product of claim 13, wherein the computer-readable program code further comprises instructions that when executed by a processor, cause the processor to calculate a price for the software service request based on statistical algorithms using distinct margins for software service requests of different severity levels.

* * * * *